(12) United States Patent
Donovan et al.

(10) Patent No.: US 10,016,954 B2
(45) Date of Patent: *Jul. 10, 2018

(54) SELF HEALING SALT WATER BARRIER

(75) Inventors: Michael Donovan, Huntley, IL (US); Thomas W. Beihoffer, Arlington Heights, IL (US); Nataliya V. Larionova, Evanston, IL (US); Marek R. Mosiewicz, Chicago, IL (US)

(73) Assignee: AMCOL INTERNATIONAL CORPORATION, Hoffman Estates, IL (US)

( * ) Notice: Subject to any disclaimer, the term of this patent is extended or adjusted under 35 U.S.C. 154(b) by 1596 days.

This patent is subject to a terminal disclaimer.

(21) Appl. No.: 13/077,871

(22) Filed: Mar. 31, 2011

(65) Prior Publication Data
US 2011/0177736 A1    Jul. 21, 2011

Related U.S. Application Data

(63) Continuation-in-part of application No. 11/942,638, filed on Nov. 19, 2007.

(51) Int. Cl.
*B32B 5/30* (2006.01)
*E21D 11/38* (2006.01)
(Continued)

(52) U.S. Cl.
CPC ............... *B32B 5/30* (2013.01); *B32B 5/022* (2013.01); *B32B 5/22* (2013.01); *B32B 5/24* (2013.01);
(Continued)

(58) Field of Classification Search
USPC ......... 428/47, 407, 339, 86, 91, 99, 68, 212, 428/220, 41.8, 912; 156/70, 71, 60,
(Continued)

(56) References Cited

U.S. PATENT DOCUMENTS 3,949,560 A    4/1976   Clem
3,986,365 A   10/1976   Hughes
(Continued)

FOREIGN PATENT DOCUMENTS

DE    3704503 A1    8/1988
EP     450924 A2 * 10/1991
(Continued)

OTHER PUBLICATIONS http://drake.marin.k12.ca.us/stuwork/rockwater.html. Components and Salinity of Salt Water, 2010, pp. 1-4.*
(Continued)

*Primary Examiner* — Chinessa T. Golden
(74) *Attorney, Agent, or Firm* — Marshall, Gerstein & Borun LLP

(57) ABSTRACT

Geocomposite articles that can provide a barrier against high conductivity water e.g., ocean water, are described and their method of manufacture, for waterproofing surfaces that contact high conductivity water. The geocomposite article mat includes a woven or non-woven geotextile sheet or mat containing a powdered or granular partially cross-linked acrylamide/acrylate/acrylic acid copolymer across its entire major surface(s). The powdered or granular copolymer has an unexpectedly high free-swell when hydrated with High Conductivity water, such as ocean water. A liquid-impermeable cover sheet is adhered to the upper major surfaces of the filled copolymer-carrying geotextile to provide a primary high conductivity water barrier layer that, if ruptured, is sealed by the swell of an underlying layer of water-insoluble, partially cross-linked acrylamide/acrylic acid copolymer.

36 Claims, 8 Drawing Sheets

(51) Int. Cl.
  *B32B 5/22* (2006.01)
  *B32B 5/24* (2006.01)
  *B32B 27/30* (2006.01)
  *E02D 17/20* (2006.01)
  *E02D 31/00* (2006.01)
  *B32B 5/02* (2006.01)
  *B32B 37/12* (2006.01)
  *B32B 37/24* (2006.01)
  *B32B 7/12* (2006.01)
  *B32B 27/12* (2006.01)
  *B32B 27/32* (2006.01)
  *B32B 29/00* (2006.01)
  *B32B 3/26* (2006.01)
  *B32B 3/28* (2006.01)

(52) U.S. Cl.
  CPC ............ *B32B 27/30* (2013.01); *E02D 17/202* (2013.01); *E02D 31/004* (2013.01); *E21D 11/383* (2013.01); *B32B 3/266* (2013.01); *B32B 3/28* (2013.01); *B32B 5/024* (2013.01); *B32B 7/12* (2013.01); *B32B 27/12* (2013.01); *B32B 27/304* (2013.01); *B32B 27/306* (2013.01); *B32B 27/32* (2013.01); *B32B 29/002* (2013.01); *B32B 37/12* (2013.01); *B32B 37/24* (2013.01); *B32B 2262/00* (2013.01); *B32B 2262/0253* (2013.01); *B32B 2262/0261* (2013.01); *B32B 2262/0276* (2013.01); *B32B 2262/04* (2013.01); *B32B 2262/062* (2013.01); *B32B 2262/101* (2013.01); *B32B 2264/025* (2013.01); *B32B 2264/10* (2013.01); *B32B 2264/12* (2013.01); *B32B 2270/00* (2013.01); *B32B 2305/18* (2013.01); *B32B 2307/546* (2013.01); *B32B 2307/714* (2013.01); *B32B 2307/718* (2013.01); *B32B 2307/726* (2013.01); *B32B 2307/7265* (2013.01); *B32B 2307/762* (2013.01); *B32B 2571/00* (2013.01); *Y10T 156/10* (2015.01); *Y10T 442/273* (2015.04); *Y10T 442/3854* (2015.04); *Y10T 442/674* (2015.04)

(58) Field of Classification Search
  USPC ........... 156/308.2, 334, 73.1, 73.6; 524/547; 264/232; 442/148, 394, 286, 63, 93; 210/501, 764, 747, 170.03, 254, 265, 210/532.1, 679, 170; 405/128, 36, 129, 405/43, 46, 50, 229
  See application file for complete search history.

(56) References Cited

U.S. PATENT DOCUMENTS

| | | | |
|---|---|---|---|
| 4,021,402 A | 5/1977 | Clem | |
| 4,048,373 A | 9/1977 | Clem | |
| 4,103,499 A | 8/1978 | Clem | |
| 4,202,413 A | 5/1980 | Messenger | |
| 4,344,722 A | 8/1982 | Blais | |
| 4,467,015 A | 8/1984 | Clem | |
| 4,501,788 A | 2/1985 | Clem | |
| 4,534,926 A | 8/1985 | Harriett | |
| 4,565,468 A | 1/1986 | Crawford | |
| 4,634,538 A | 1/1987 | Alexander | |
| 4,656,062 A | 4/1987 | Harriett | |
| 4,693,923 A | 9/1987 | McGroarty et al. | |
| 4,787,780 A | 11/1988 | Harriett | |
| 4,872,911 A * | 10/1989 | Walley et al. | 106/33 |
| 5,132,021 A * | 7/1992 | Alexander | 210/679 |
| 5,149,750 A | 9/1992 | Niessner et al. | |
| 5,171,781 A * | 12/1992 | Farrar et al. | 524/547 |
| 5,237,945 A * | 8/1993 | White | 112/420 |
| 5,317,834 A | 6/1994 | Anderson | |
| 5,389,166 A | 2/1995 | White | |
| 5,501,753 A * | 3/1996 | Stark | 156/70 |
| 5,578,219 A | 11/1996 | Kajita | |
| 5,679,364 A * | 10/1997 | Levy | 424/405 |
| 5,811,531 A * | 9/1998 | Iguchi et al. | 536/1.11 |
| 6,610,780 B1 | 8/2003 | Payzant et al. | |
| 6,737,472 B2 * | 5/2004 | Zhou et al. | 524/789 |
| 6,783,802 B2 | 8/2004 | Darlington, Jr. et al. | |
| 6,802,672 B2 * | 10/2004 | Hardin et al. | 405/129.65 |
| 6,852,813 B2 * | 2/2005 | Darlington et al. | 526/223 |
| 2005/0103707 A1 * | 5/2005 | Olsta et al. | 210/502.1 |
| 2007/0044528 A1 | 3/2007 | Kitchen | |
| 2014/0302735 A1 | 10/2014 | Donovan et al. | |

FOREIGN PATENT DOCUMENTS

| | | |
|---|---|---|
| EP | 1233032 A1 * | 8/2002 |
| EP | 1426402 A2 | 6/2004 |
| GB | 1029513 A | 5/1966 |
| GB | 1059363 A | 2/1967 |
| GB | 1129840 A | 10/1968 |
| GB | 2202185 A | 9/1988 |
| WO | WO 9715367 A1 * | 5/1997 |
| WO | WO-00/73596 A1 | 12/2000 |
| WO | WO-2004/016425 A2 | 2/2004 |

OTHER PUBLICATIONS

U.S. Fish and Wildlife Service. Refuge Habitats. http://www.fws.gov/refuge/Don_Edwards_San_Francisco_Bay/habitat.html. 2013.*

European Search Report for corresponding European Application No. 12162611.3, dated May 3, 2013.

International Search Report and Written Opinion, International Application No. PCT/US2008/075162 (dated Dec. 12, 2008).

International Preliminary Report on Patentability, International Application No. PCT/US2008/075162, dated Nov. 5, 2009.

* cited by examiner

*→ Agriculture-Grade SAP Has Better Divalent Ion Tolerance Than Standard SAP*

SELF HEALING SALT WATER BARRIER

CROSS-REFERENCE TO RELATED APPLICATION

This application is a continuation-in-part of, and claims priority from, application Ser. No. 11/942,638, filed Nov. 19, 2007, hereby incorporated by reference in its entirety.

FIELD OF THE INVENTION

The present invention is directed to methods and articles of manufacture useful as waterproofing membranes for waterproofing surfaces against the penetration of high conductivity salt-containing water, e.g., bay water, groundwater, marsh water, brackish water, ocean water, mining waste water, such as in the formation of waterproofed construction areas subjected to contact with high conductivity waters such as lagoons, hazardous or toxic waste containment areas, subterranean foundation surfaces and the like. More particularly, the present invention is directed to salt-water waterproofing articles of manufacture formed by sandwiching a partially cross-linked polyacrylamide/partially neutralized polyacrylic acid copolymer between two geotextile fabrics, woven or non-woven. Alternatively, the copolymer can be forced into one or both of the woven or non-woven geotextile fabrics or produced directly in the geotextile fabric(s) via polymerization or other processes. To achieve the full advantage of the invention, a water-impermeable film or sheet material (membrane) is adhered to an outer surface of one of the geotextile fabrics as a first salt-water contacting layer.

BACKGROUND OF THE INVENTION AND PRIOR ART

Various polymers, swellable clays, and multi-layer articles of manufacture have been applied to the surface of soil to provide a waterproofing layer to prevent the penetration of water and/or hazardous or toxic materials into the earth, and to provide lagoons, ponds and other water-containment areas. Water-swellable clays, such as bentonite, have been applied directly to the soil surface and impacted in place, as disclosed in this assignee's prior U.S. Pat. No. 3,986,365. In addition, many different multi-layered articles of manufacture containing a water-swellable clay, such as sodium bentonite, have been manufactured by securing the water-swellable clay to major interior surfaces of flexible sheet materials, e.g., Clem U.S. Pat. No. 4,501,788, for application to the soil surface in abutting or overlapping relation to adjoining multi-layered articles. Examples of other flexible sheet materials containing adhesively secured water-swellable clays are found in the following U.S. Pat. Nos. Clem 4,467,015; McGroarty, et al. 4,693,923; Harriett 4,656,062; and Harriett 4,787,780.

U.K. published Patent Application GB 2,202,185A discloses a layer of water-swellable bentonite between flexible fabric layers that have been needle punched together in a needle loom that secures the upper and lower layers together, wherein at least one of the fabric layers is a non-woven textile material.

Another waterproofing barrier, disclosed in Blais U.S. Pat. No. 4,344,722, is constructed in the field by applying a first flexible, water-permeable fabric layer, overlaying a thickness of water-swellable clay material and applying an overlay of the same flexible, water-permeable fabric thereover. Other patents disclosing the use of water barrier layers for protecting a soil surface include British Patent Specification 1,059,363; British Patent Specification 1,029,513 and British Patent Specification 1,129,840.

German Patent DE 37 04 503 C2 discloses an article having two fabric layers including one non-woven fabric, surrounding a bentonite clay layer wherein the two fabric layers are needle punched together. Crawford U.S. Pat. No. 4,565,468 discloses an article including two fabric layers surrounding a bentonite clay layer wherein the two fabric layers are quilted together in a pattern forming four sided compartments.

While the articles described in the above-mentioned patents are effective for waterproofing against the penetration of relatively non-contaminated water, they are unable to prevent the penetration of salt (e.g., NaCl) containing water, such as ocean water. This assignee's U.S. Pat. No. 5,389,166, hereby incorporated by reference, describes incorporating a water swellable clay into a mat while laying down fiber to form the mat.

Surprisingly it has been found that a partially cross-linked copolymer of acrylamide/partially neutralized polyacrylic acid, preferably acrylamide/sodium acrylate/acrylic acid copolymer or acrylamide/potassium acrylate/acrylic acid copolymer (CAS# 31212-13-2), e.g., STOCKOSORB, STOCKOSORB F, STOCKOSORB S or STOCKOSORB 500 from Evonik Stockhausen Inc. of Greensboro, N.C., will waterproof surfaces against the penetration of high conductivity water. An alternate example of a similar copolymer is AQUASORB 3005 KC from SNF Inc of Riceboro, Ga., a copolymer of acrylamide and neutralized acrylic acid. The articles described herein are most useful to provide a water barrier against multivalent ion-containing water having a conductivity of at least 1 mS/cm, preferably at least 10 mS/cm, more preferably at least 30 mS/cm, even more preferably at least 40 mS/cm, and most preferably at least 50 mS/cm.

Super absorbent polymers ("SAPs") have been produced since the 1970s for use in a variety of products including, amongst others, hygiene products, such as disposable diapers, training pants, feminine hygiene products and incontinence devices, agricultural and horticultural products and industrial and environmental absorbents. SAPs are primarily utilized to increase or enhance the product's water-absorbency.

SAPs are produced from a variety of components by a variety of processes. For example, SAPs are often made from monomers such as acrylamide, acrylic acid and acrylate, which are particularly suitable for application in hygiene products.

Alternately, swelling clays, such as sodium smectite clays, e.g., sodium bentonite may be used to provide water-absorbency to a product. With respect to cost, the cost of swelling clays tends to be minimal compared to that of the chemical monomers described above. In addition, swelling clays are relatively stable compared to chemical monomers and are not as subject to degradation. However, swelling clays have a water absorption capacity significantly less than that of SAP, and like the common partially cross-linked partially neutralized acrylic acid copolymer SAPs, sodium smectites do not have sufficient free-swell when contacted by high conductivity salt water to act as a salt water barrier.

Some products include both an SAP and a swelling clay, as described in U.S. Pat. No. 6,610,780 and this assignee's U.S. Pat. No. 6,783,802, hereby incorporated by reference. Neither the SAPs nor the water-swellable clays, however, have been capable of waterproofing surfaces against the penetration of high conductivity ion-contaminated water, such as ocean water.

It is well known that the montmorillonite group of clays hydrate and swell in fresh water but the swelling is substantially inhibited in salt contaminated water. Salt contaminated water is often encountered in the environments of use of bentonite clays where bentonite is advantageously employed for its swelling capacity, for example, as an additive in drilling muds for the purpose of sealing fissures in earthen formations surrounding the drill hole to prevent loss of drilling fluid; and in the sealing of lagoons and landfills. When contacted with salt contaminated water, the swelling capacity and stability of common montmorillonite clays are severely inhibited making it necessary to use much greater quantities of the clay to achieve the degree of swelling needed for sealing purposes. In some cases the palygorskite clays are used instead of the montmorillonite clays because of their better dispersing properties in salt water, as disclosed in U.S. Pat. No. 4,202,413.

In the past, modified bentonite clays have been developed by this assignee having a swelling capacity substantially less inhibited in salt water. Examples of such modified bentonites are the polymer treated bentonites disclosed in the Clem U.S. Pat. Nos. 3,949,560; 4,021,402; 4,048,373 and 4,103,499.

The assignee's U.S. Pat. No. 4,634,538 teaches that one or more gums, such as xanthan gum, can be added to a water-swellable clay to improve its free swell when hydrated with salt-contaminated water. This assignee's U.S. Pat. No. 5,578,219 describes impregnating a dried, water-swellable clay with an aqueous solution of a water-soluble polymer followed by re-drying to improve the ability of the clay to absorb contaminated water.

Partially cross-linked acrylamide/sodium or potassium acrylate/acrylic acid copolymers have been used for retention of water and plant nutrients in agriculture by mixing the copolymers in soil for contact with, and as a water and nutrient source for, plants roots, but have not been recognized to provide sufficient free swell when in contact with salt-contaminated (high conductivity) water for purposes of waterproofing salt-contaminated water-contacting surfaces, as described in U.S. Patent Publication No. 2007-0044528-A1 and U.S. Pat. No. 5,317,834.

SUMMARY

The articles and methods described herein are based on the discovery that agricultural grade superabsorbent polymers partially cross-linked (water insoluble) copolymers of acrylamide/partially or fully neutralized acrylic acid, particularly potassium and/or sodium acrylate, have exceptional and unexpected free swell when in contact with high conductivity water or multivalent ion-containing-contaminated water. The articles of manufacture described herein all include a partially cross-linked acrylamide/acrylate/acrylic acid copolymer and are used for waterproofing against high conductivity salt-containing water. More particularly, the partially cross-linked acrylamide/acrylate/acrylic acid copolymers, described herein, in accordance with a preferred embodiment of the present invention, are incorporated into sheet or roll form as waterproofing geotextile articles; or are incorporated into deformable, putty-like consistency articles for waterproofing concrete joints and the like (see U.S. Pat. No. 4,534,926, hereby incorporated by reference) by substituting the agricultural grade SAPs described herein for the bentonite clay of the 4,534,926 patent. The sheet or roll form geotextile articles of manufacture described herein are self-healing (will seal cuts, cracks and fissures caused in adjacent water barrier sheets or films during or after installation) and are particularly effective in sealing seems between two water barrier substrates, e.g., concrete sections and between adjacent, geocomposite liners in contact with high conductivity salt water.

In a preferred embodiment, geocomposite articles described herein contain the partially cross-linked acrylamide/acrylate/acrylic acid copolymers sandwiched between two geotextile fabrics as a safety layer under a separate, water barrier sheet material or membrane layer adhered thereto.

Accordingly, one aspect of the articles and method described herein is to provide an acrylamide/acrylate/acrylic acid copolymer that has sufficient free swell when in contact with high conductivity water such that the copolymer can provide a barrier to seal against penetration of the contaminated water.

Another aspect of the articles and methods described herein is to provide multi-layer geocomposite articles including a polymeric barrier layer, a pair of woven or non-woven geotextile layers, having an intermediate layer of a partially cross-linked acrylamide/acrylate/acrylic acid copolymer sandwiched there between. The copolymer has sufficient free-swell when contacted by high conductivity water such that if a crack or rupture occurs in a polymeric barrier layer adhered to one of the geotextile fabrics, the confined copolymer will swell sufficiently upon salt water contact to fill the crack or rupture to heal the crack or rupture and prevent further salt water leakage.

The above and other aspects and advantages will become apparent from the following detailed description taken in conjunction with the drawings.

DETAILED DESCRIPTION OF THE PREFERRED EMBODIMENTS

The present invention may be understood more readily by reference to the following detailed description of the invention and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Conductivity is a measure of the level of ion concentration of a solution. The more salts, acids or bases are dissociated, the greater the conductivity of the solution. In water or wastewater it is mainly a matter of the ions of dissolved salts, and consequently the conductivity is an index of the salt load in wastewater. The measurement of conductivity is generally expressed in S/cm (or mS/cm) which is the product of the conductance of the test solution and the geometric factor of the measuring cell. For purposes of this invention, high conductivity waters are defined as waters with conductivity greater than 1 mS/cm. Conductivity can be measured using a variety of commercially available test instruments such as the Waterproof PC 300 handheld meter made by Eutech Instruments/Oakton Instruments.

In the preferred embodiment, the partially cross-linked acrylamide/acrylate/acrylic acid copolymer is incorporated as a layer between two woven or non-woven geotextile sheet material fabric layers with a water barrier sheet or film barrier or membrane layer, preferably a polymer film or sheet material or membrane layer, adhered to an exposed surface of one of the geotextile layers. The polymer sheet material layer would adhered to an exposed surface of one of the geotextile layers positioned, in used, to first contact the high conductivity water and the copolymer sandwiched between the two fabric layers to perform the function of a safety layer to prevent the flow of high conductivity water through the article if the polymer sheet material layer is defective or develops a crack or hole during installation or during use. Alternatively, the copolymer can be incorporated into the intersticies of one or both of the geotextile fabric layers to create a dual geocomposite fabric/copolymer composite layer that serves as the safety layer attached to the membrane layer to prevent the flow of high conductivity water through the article if the polymer sheet material layer is defective or develops a crack or hole during installation or during use.

Figure 1:
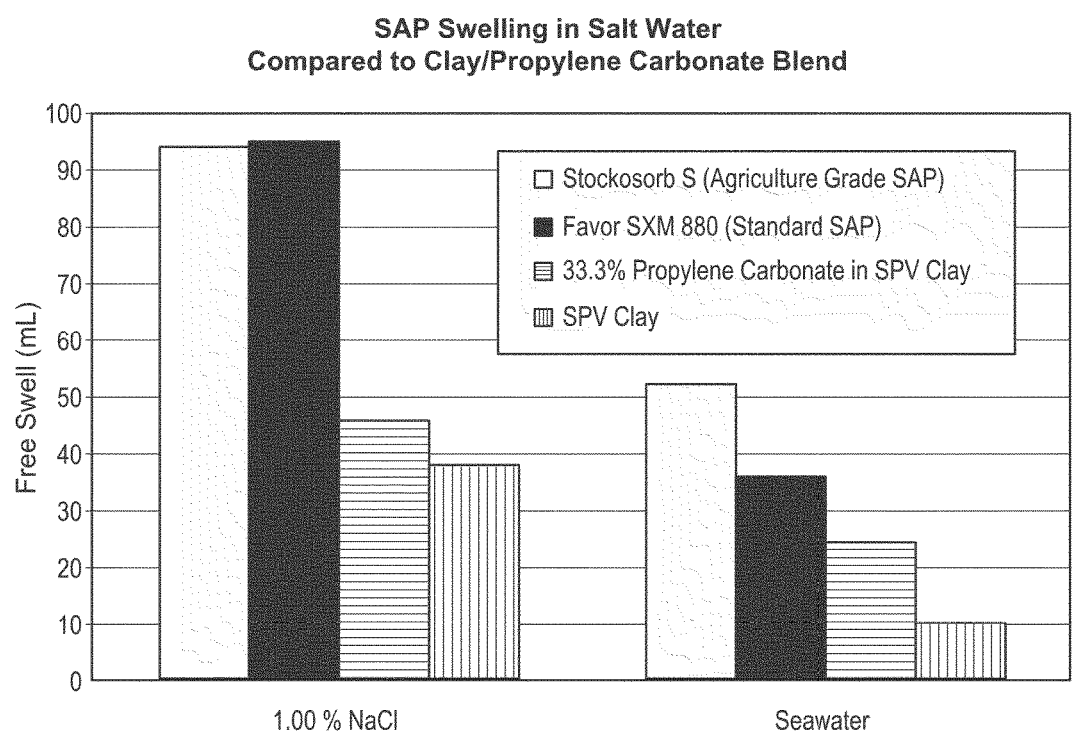
FIG. 1 is a graph showing the free swell volume (2 grams of material in an excess of the aqueous salt solution) of the partially cross-linked acrylamide/acrylate/acrylic acid copolymers Stockosorb S in aqueous 1.0% NaCl and 4.5% sea salt compated to a standard, partially cross-linked acrylate/acrylic acid copolymer SAP (Favor SXM 880) and a water swellable sodium bentonite (SPV) clay.

The partially cross-linked acrylamide/partially neutralized acrylic acid copolymers, e.g., STOCKOSORB 500™ STOCKOSORB F™ and/or STOCKOSORB S™, have been found to have substantial free swell when contacted by high conductivity solutions. Examples of tested high conductivity aqueous solutions are 1% NaCl (conductivity of 18 mS/cm) and synthetic seawater (4.5% sea salt; conductivity of 53.2 mS/cm). The results of the free swell testing indicate that the Stockosorb S copolymer had the highest free swell compared to traditional superabsorbent polymers and bentonite solution (See FIG. 1). partially cross-linked acrylamide/partially neutralized acrylic acid copolymers provide substantial free swells when in contact with aqueous solutions contaminated with any, or a combination of, Na+, Ca++, Mg+, Al+++ and other multivalent cations in combination with anions that are common in sea water and other wastewaters. To achieve the full advantage of the geocomposite articles and methods described herein, the partially cross-linked acrylamide/acrylate/acrylic acid copolymers used in the geocomposite articles should have a free swell in 4.5% salt water of at least 35 ml per 2 grams of copolymer, preferably at least about 40 ml/2 grams, more preferably at least about 50 ml/2 grams. Free swells are determined by sprinkling 2 grams of powdered copolymer into a 100 ml graduated cylinder and filling the cylinder to 100 ml with 4.5% salt water. The volume of copolymer that settles to the bottom of the graduated cylinder is then measured and is the free swell.

In the preferred embodiment, described herein, are multi-layer articles of manufacture that are salt water barrier geocomposite mats, and their method of manufacture. In the preferred embodiment, the geocomposite mat includes two pre-formed woven or non-woven geotextile fabric material layers, each having a thickness of about 0.5 mm to about 200 mm, preferably about 1 mm to about 100 mm, each having a layer of powdered or granular partially cross-linked acrylamide/partially neutralized acrylic acid copolymer, either at least partially embedded in a contacting portion of their thicknesses across their entire major contacting surfaces, or provided in a separate layer between the two geotextile sheet or fabric layers. In the preferred embodiment, the powdered or granular copolymer is at least partially disposed within the pores of each geotextile fabric to surround the fibers at the interface of the two geotextile fabrics, e.g., by vacuum suction, by vibrating during deposition of the copolymer thereon to allow the powdered or granular copolymer to flow by gravity and vibrational forces into the pores of one or both of the geotextile sheets or mats, or simply by virtue of being sized to be received within the pores of at least one of the contacting surfaces of the woven or non-woven (preferably non-woven) geotextile fabrics or mats.

In the preferred embodiment, a liquid-impermeable cover sheet (membrane layer) is adhered to an upper major surface of one of the copolymer-containing geotextile fabrics or mats to provide a primary water-impermeable layer to the article. Optionally, the edges of the copolymer-containing geotextile sheet or mat can be sealed, such as by providing the upper water-impermeable cover sheet slightly larger than the dimensions of the geotextile sheet or mat and gluing or otherwise adhering the extra cover sheet material to the edges of the pair of geotextiles, such as by heat sealing them together. Other edge sealing options include sewing, needlepunching, taping and ultrasonic welding of the cover sheet to the edges of the geotextile sheets or mats, or by applying a separate, edge-covering material that can be glued, bonded, heat sealed or ultrasonically welded to the water-impermeable cover sheet and/or to the geotextile sheets or mats. Edge sealing materials preferably are liquid-impermeable.

In addition to the layer of partially cross-linked acrylamide/partially neutralized acrylic acid copolymer, powdered or granular materials can be admixed with the copolymer or can be applied as a separate layer. The additional powdered or granular materials include water-swellable sodium smectite clay, organophilic clay, activated carbon, powdered adhesives, coke breeze, zero valent iron, apatite, zeolite, peat moss, polymeric ion exchange resins, polymeric adsorbents and mixtures thereof. Preferably, the copolymer is disposed adjacent to the water-impermeable sheet or film barrier layer, and also may contain other materials, admixed therewith in an amount up to about 80% by weight of the mixture.

The method of manufacture permits the manufacture of a geocomposite article that includes the partially cross-linked acrylamide/acrylate/acrylic acid copolymer that is structurally secure, without substantial lateral movement, and contains the swelling material either as a discrete layer between the two geotextiles, uniformly distributed between the two geotextiles, or distributed as a gradient throughout one or both of the geocomposite fabrics. The multi-layer geocomposite article can be manufactured to provide either a flexible or a rigid geocomposite article, and permits the manufacture of various modified geocomposite articles that include the salt water barrier swelling copolymer in addition to a zeolite or an organophilic clay with or without a sodium smectite water-absorbent material; the application of layer(s) of liquid-impermeable films or sheets of material over not only one, but over both major surfaces of the geocomposite article to confine the granular or powdered copolymer material in place within the geotextile sheet or mat; the application of solid or liquid adhesive materials or compositions to glue a major undersurface of the barrier layer to the copolymer or to the geotextile sheet material containing the copolymer for complete retention. The geotextile sheets that sandwich the copolymer therebetween can be bonded together either mechanically (sewing, needlepunching or gluing), chemically, or physically (i.e., melting, or the like). The structure can be strengthened or reinforced by inserting one or more rigidifying materials into, or onto, the geocomposite article during manufacture, such as a sheet of perforated fiberglass; rope; cardboard; relatively rigid, liquid-permeable corrugated materials, e.g., corrugated cardboard, and the like at some point at or between the top and bottom major surfaces of the geocomposite article to provide various degrees of flexibility or rigidity; the capability of manufacturing the geocomposite articles without the necessity of a consolidation step; and providing various sizes, shapes and weights of geotextiles to achieve the benefits of each.

The copolymers described herein are lightly cross-linked, i.e., have a crosslinking density of less than about 20%, preferably less than about 10%, and most preferably about 0.01% to about 7%. The crosslinking agent most preferably is used in an amount of less than about 7 wt %, and typically about 0.1 wt %, based on the total weight of monomers. Examples of crosslinking polyvinyl monomers include, but are not limited to, di, tri or other multi-functional acrylic, methacrylic, vinyl ether or acrylamido functional compounds that are well known in the art.

The relative amounts of the acrylamide; acrylate; and acrylic acid in the salt water-waterproofing copolymers described herein can vary widely from about 1 mole percent to about 99 mole percent of each in the copolymer. Best results for achieving excellent free swells in high conductivity water are achieved where acrylamide forms about 5% to about 90 mole % of the copolymer, preferably about 25% to about 80 mole %, preferably about 50% to about 70% mole % of the copolymer; sodium, ammonium and/or potassium acrylate forms about 10 mole % to about 60 mole % of the copolymer, preferably about 15 mole % to about 40 mole % of the copolymer; and acrylic acid forms about 0 mole % to about 30 mole %, preferably about 2 mole % to about 20 mole % of the copolymer, more preferably about 5 mole % to about 20 mole % of the copolymer. Other material compositions that give a free swell of greater than about 35 mL/2 grams material in 4.5% sea salt in water are envisioned for this invention. Other monomers can be present in the copolymer including acrylic and methacrylic esters and acids, and substituted acrylamide and methacrylamides provided that the other monomers do not detract from the ability of the copolymer to absorb high conductivity water.

Water-Impermeable Adhered Membrane

Figure 4:
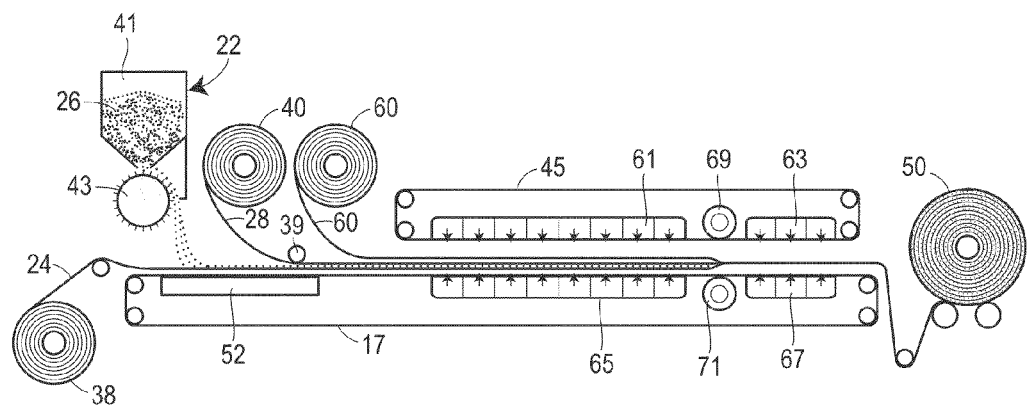
FIG. 4 is a schematic view of a preferred apparatus and method of manufacture used to make both embodiments (GCA-1 and GCA-2) of the geocomposite articles useful as salt water barriers as described herein.
Figure 5:
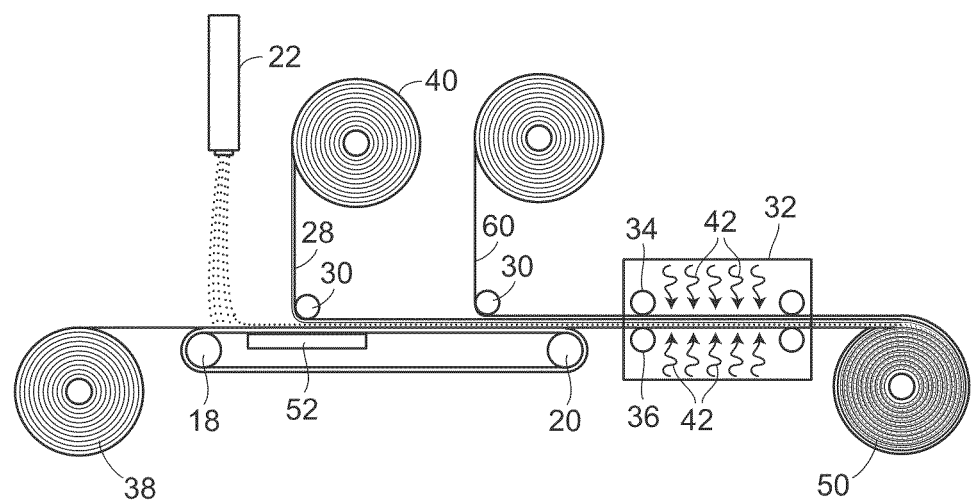
FIG. 5 is a schematic view, similar to FIG. 2 of apparatus and methods used to manufacture both embodiments (GCA-1 and GCA-2) of geocomposite articles useful as salt water barriers.

The preferred membrane for the product (GCA-2) of FIGS. 4 and 5 is a multi-layer heat-weldable polyvinylchloride sheet product. The composition of the PVC membrane includes plasticizers to allow the product to be flexible. In particular, the incorporation of polymeric plasticizers (molecular weight>10,000 g/mol) at a concentration of >50 wt. % helps to insure minimal plasticizer loss in use. The multilayer PVC membrane is preferred to contain a polyester reinforcing fabric in between the PVC layers to provide good tear and puncture resistance in use. To provide good longevity in use, the composition of the membrane can also include UV stabilizers, anti-oxidant packages and other ingredients to retard the oxidative degradation of the components of the PVC membrane. PVC-based geomembranes can vary in thickness, but preferable membranes are between 40 and 60 mils thick.

Other typical geomembranes can be used such as those composed of low density polyethylene (LDPE), high density polyethylene (HDPE), polyvinylchloride (PVC), chlorinated polyethylene (CPE), chlorosulfonated polyethylene (CSPE), ethylenevinylacetate (EVA) and copolymers and combinations thereof. These membranes can be designed to be self adhering or designed to be easily adhered through the use of a multilayer film product.

The apparatus used to manufacture the copolymer/geosynthetic sandwich, with (FIGS. 4, 5 and 7) and without (FIGS. 2 and 7) an upper membrane, is schematically shown in FIGS. 2, 4, 5 and 7.

Figure 2:
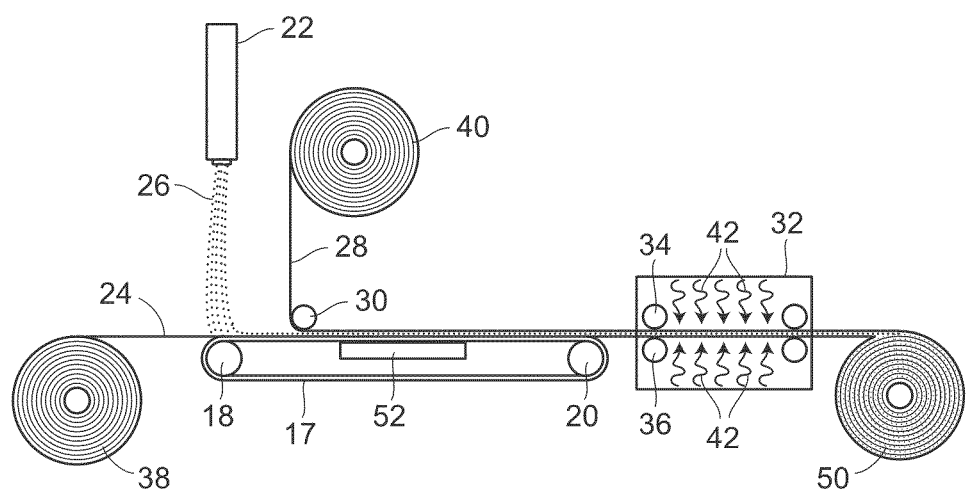
FIG. 2 is a schematic view of apparatus and methods of manufacture used to make one embodiment (GCA-1) of the geocomposite articles useful as salt water barriers described herein.
Figure 3:
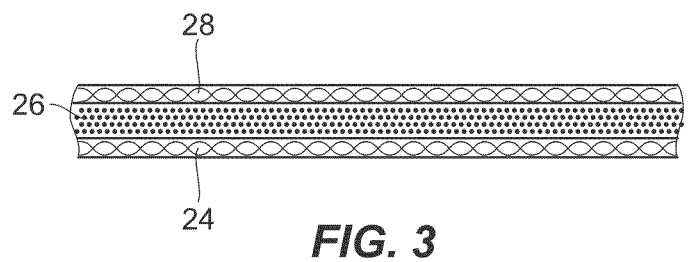
FIG. 3 is a side view of the geocomposite article (GCA-1) manufactured by the apparatus of FIG. 2.
Figure 6:
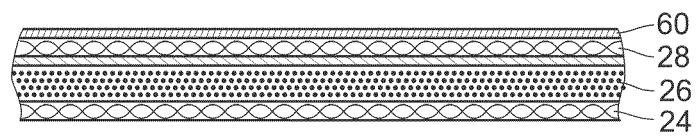
FIG. 6 is a side view of the geocomposite article (GCA-2) manufactured by the apparatus of FIGS. 4 and 5.
Figure 7:
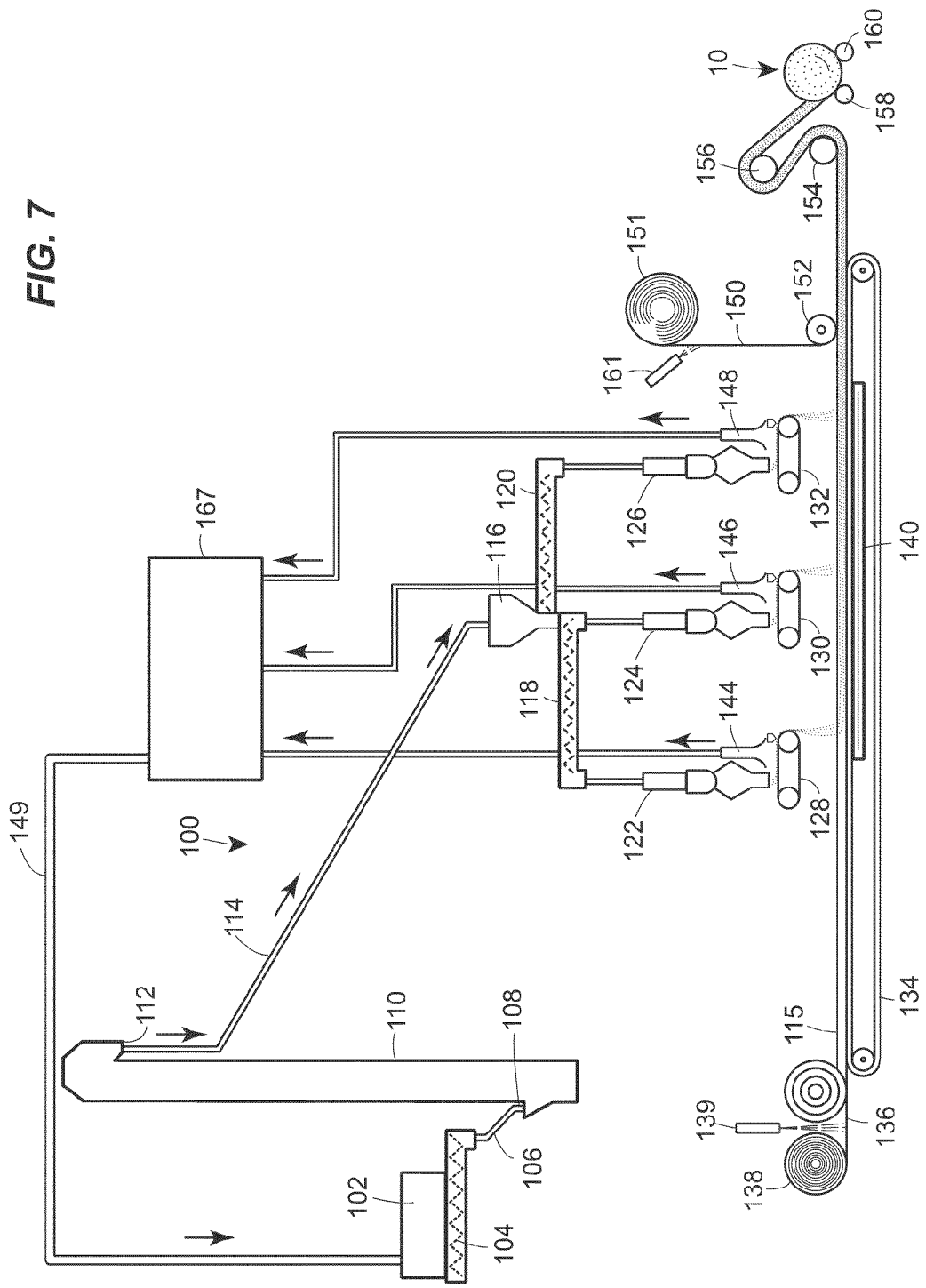
FIG. 7 is a schematic view of another embodiment of apparatus and methods of manufacture used to make the geocomposite articles, containing a number of optional features, useful as salt water barriers as described herein.

As shown in FIGS. 2-7, there are illustrated articles of manufacture and apparatus for manufacturing a product (GCA-1) (FIG. 3) having a partially cross-linked acrylamide/acrylate/acrylic acid powdered or granular material (hereinafter referred to as "SAP") sandwiched between two geosynthetic fabrics (FIGS. 2 and 3); and a product (hereinafter referred to as "GCA-2") (FIGS. 4, 5 and 6) that includes a membrane adhered to one exposed major surface of the article of FIG. 3. It should be understood that by providing multiple feeding devices, as shown in FIG. 7, a plurality of different granular or powdered materials, including the SAP copolymer, and with or without various reinforcing materials and/or coating materials to provide various characteristics or properties to the finished salt water geocomposite barrier articles 10, as will be described in more detail hereinafter.

A mixture of an adhesive powder and the superabsorbent copolymer powder (SAP) is laminated between two textiles to produce the GCA-1 product of FIG. 3, and in another embodiment, one of the textiles includes an adhered membrane on the top (product designated "GCA-2"). In the preferred embodiment, both products employ a "fiberlocked woven" (FLW) (capped woven) textile. In the preferred embodiment, an FLW textile is used as both the upper and lower fabrics, although either fabric may be woven or non-woven. In the preferred embodiment, a water-impermeable, e.g., PVC membrane is used as a first-encountered water barrier, with the geotextile/SAP/geotextile sandwich thereunder serving as a safety barrier. The superabsorbent copolymer (SAP) preferably is a crosslinked polyacrylamide/polyacrylate/acrylic acid copolymer called Stockosorb F. The powdered adhesive preferably is a low melting polyethylene/polyvinyl acetate blend, e.g., such as Jowatherm 60 214.30.

The FLW materials are typically constructed by needle punching a light nonwoven into a woven textile. The fibers of the cap material can be comprised of various synthetic and natural materials. Preferably, the cap is composed of higher melting polymers such as polypropylene, polyamides or polyethylene terephthalate the like. The cap fibers can be single component or multi-component. Functional fibers can be used such as those which absorb water, promote adhesion, conduct heat or electricity or have electromagnetic or radiofrequencey barrier properties. The cap weight can range, for example, from 1 oz/yd$^2$ to 40 oz/yd$^2$ depending on the desired properties. Preferably the cap weight is in the range of 3 to 5 oz/yd$^2$. The fiber denier of the cap can vary. Preferably, the fiber is in the range of 10 to 20 denier.

The yarn of the woven material can be constructed to giving varying warp and weft counts. The pic count of the yarns in the warp and weft direction can vary. Preferably, the pic count is in the range of 15 to 30 yarns per inch. The yarn can be in different forms such as slit tape or fibrillated tapes. The composition of the yarn can also vary and can be made from natural or synthetic materials. Preferably the yarns are composed of higher melting polymers such as polypropylene, polyamides or polyethylene terephthalate and the like. Thickness of the yarn can also vary, but the yarn is preferably in the range of 3 to 5 millimeters.

The SAP/adhesive powder blend is applied to an upper surface of the bottom FLW geotextile and covered with the upper geotextile fabric before entering the oven. Heat and pressure are applied to the product to fuse the materials together. The product should be heated evenly and thoroughly to ensure proper melting and fluxing of the adhesive around the S$^4$P particles.

The SAP and adhesive are blended together in a preferred ratio of 45/55 wt/wt, respectively. The 45/55 ratio is preferred since it will improve adhesion and cohesion on exposure to water. For the initial work, blending was accomplished using a cement mixer, and also using a ribbon blender.

One of the keys to good product performance is the configuration of the FLW. In one preferred embodiment, the mixture of adhesive and copolymer SAP/adhesive mixture is applied to a major surface of the FLW that has tufts of nonwoven punched through the woven textile. Upon swelling, the fibers, which are locked together by the adhesive, will be drawn through the woven fabric. The fiber drawing will continue until the entanglement of the fibers on the cap side prevents any more draw through the woven textile, creating internal pressure. The cap side will allow for binding to substrate surfaces, such as concrete, on curing. When producing the two geotextile/SAP copolymer sandwich, tufts of nonwoven fibers are against the powder mixture (cap side is on the outside of the product).

The preferred membrane is a bi-component coextruded blown film of polypropylene and includes a coating of heat-activated adhesive. However, it is understood that the adhesive can be mixed with the copolymer SAP powder or applied as a separate layer over the copolymer SAP or applied as an undercoating to an undersurface of the upper geosynthetic fabric.

To start the production process, as shown in FIGS. 2, 4 and 5, a bottom FLW 24 is laid on the belt 17 from roll 38 and fed a SAP/adhesive mixture 26, dropped by gravity onto an upper surface of the bottom FLW from feeding device or scatter coater 22. A second geotextile fabric 28, from roll 40, then is applied, under roller 30 and 39, over the SAP/adhesive mixture, as shown in FIGS. 2 and 4, to sandwich the SAP/adhesive mixture between the two geosynthetic fabrics 24 and 28. As shown in FIGS. 2 and 5, the sandwiched SAP/adhesive composite is fed into oven 32 and 65 equipped with pull rolls 34 and 36 at the entrance which serve to continuously unwind the two FLW geosynthetic fabrics 24 and 28 from rolls 38 and 40. The unwinding and winding stations have tension control (not shown) to ensure no wrinkling. Wrinkling of the FLW can result in pooling of the SAP/adhesive powder leading to uneven distribution. Once the bottom textile 24 is in the oven, the powder feeding device 22 is started. The top fabric 28 is then brought down to cover the SAP/adhesive powder and fed into the oven 32. Once the top fabric is in place, heating elements 42 and 61 are turned on to convey heat to the product which melts the adhesive powder.

The copolymer SAP/adhesive powder mixture is loaded into the scatter coater feeding device 22 that is positioned above the laminating conveyor belt 17. As shown in FIG. 4, the scatter coater 22 is equipped with a hopper 41 that feeds a knurled roll 43. The gaps between pins in the knurled roll catch the powder, which is taken away (by the rotation of the roll) to a series of brushes (not shown). The brushes knock the powder from the roll and the powder free falls to the FLW textile 24 below. In this embodiment, shown in FIG. 4, the process relies on heat transfer from two silicone treated belts 17 and 45 which are warmed by a plurality of banks of IR heaters 61, 63, 65 and 67 on the top and bottom of the oven. Pressure rolls 69 and 71 converge to consolidate the layers together, while heated. The upper belt 45 and/or lower belt 17 are arranged to converge for better heating of the geocomposite article being manufactured and for applying consolidating pressure from rollers 69 and 71. The line is equipped with a dust collector near the back side of the scatter coater (not shown) which serves to minimize dust around the scatter coater 22.

A more consistent deposition rate is achieved by maintaining a constant level in the hopper 22, which in-turn, delivers a constant pressure of powder into the knurled roll. A powder loading of 72 grams per square foot of geotextile major surface area is preferred.

A small amount of shrinkage is encountered during the lamination process. The shrinking can slightly increase the MPU of the powder. Generally, the bottom FLW fabric will start at 63" width and exit the oven at about 61.5" which is about 2.5% shrinkage.

The oven preferably has temperature control across the web in three zones (East, Center, West) for both the top and bottom. There materials should not be heated to more than approximately 400° F. for all six set points on the control panel for prolonged periods of time to prevent dimenstional changes of the textiles or sheet goods. Preferrably, the oven should be equipped with preheating and cooling zones on the top and bottom. The preheat temperature is set to approximately 230° F. to allow for initial melting of the adhesive. The cooling zone is chilled by water so no setting is required. The line can also be fitted with an additional bank of infrared heat lamps before the entrance of the oven. The addition of the infrared lamps achieves higher production rates since the heat transfer from the belt is not as efficient as radiant heating. The infrared lamps pre-heat the copolymer SAP/adhesive powder mixture before mating with the upper fabric. The lamps are suspended over the surface of the belt. The heating from the infrared lamps can be controlled using a temperature sensor to prevent overheating.

Pressure is applied to the product as it travels through the oven. 90 PSI lamination pressure has been found to produce excellent product, but higher and lower pressures also may be used to laminate all layers together securely.

The product preferably is accumulated into master rolls 50 for conversion into smaller rolls as a second step It is important to assure melting of the adhesive inside the product. Upon attempting to peel back the FLW geosynthetic from the copolymer SAP/adhesive mixture, there should be good resistance. The product inside can be inspected by cutting away at the fibers of the FLW and pulling away the woven.

In one embodiment, the powdered or granular copolymer 26 penetrates the geotextile sheet or mat 24 by vibrating the geotextile 24 with vibrator 52. Alternatively, vacuum can be applied under the geotextile sheet or mat 24. Alternatively, the copolymer SAP/adhesive mixture 26 minimally penetrates into an upper surface of the geotextile sheet or mat 24 to form a distinct SAP/adhesive copolymer layer 26 disposed between the lower geotextile sheet or mat 24 and the upper geotextile sheet or mat 28, as shown in FIG. 3.

Additional granular or powdered materials can be applied to the lower geotextile sheet or mat 24 from additional feeding conduits, as shown in FIG. 7, to provide one or more surface concentrations of SAP/adhesive copolymer mixture 26 or to apply a different powdered or granular material. As shown in FIGS. 4 and 5, a primary barrier (membrane) layer 60 preferably is adhered to the upper major surface of the upper geotextile sheet or mat 28. Other nonlimiting methods of introduction of the copolymer SAP/adhesive powder into the composite structure can be envisioned. Alternative methods could include: the coating or spraying of a paste or dispersion of the copolymer SAP/adhesive mixture onto the sheet lower geotextile fabric 24 via extrusion or roll coating; preassembling a copolymer/fabric composite to be optionally later combined with a water-impermeable membrane layer to form the final GCA-2 composite; or other methods to achieve the desired structure.

Turning now to FIG. 7, there is shown a schematic diagram of one embodiment for loading a lower geotextile mat 115 with powdered or granular SAP/adhesive copolymer in a dry state. The dry material feeding apparatus, generally designated by reference numeral 100 is useful for depositing the partially cross-linked acrylamide/acrylate/acrylic acid copolymer, with or without other powdered or granular materials, such as an organophillic clay or other materials, from a receiving hopper 102. An auger 104 is disposed at a lower end of the receiving hopper 102, and in fluid communication therewith, to force the copolymer material through conduit 106 to an inlet 108 of elevator 110. The copolymer is discharged from the elevator 110 at elevator outlet opening 112, through conduit 114 into a receiving hopper 116. A pair of augers 118 and 120 in fluid communication with a lower portion of hopper 116 force the copolymer into one, two or three feeding mechanisms, generally designated by reference numerals 122, 124 and 126, for feeding the copolymer in a controlled manner to one, two or three continuous feed conveyor belts 128, 130 and 132 successively aligned above an elongated product conveyor belt 134.

The copolymer generally is applied over the geotextile sheet or mat 115 in an amount of about 0.1 ounce to 3 pounds of powdered or granular copolymer per square foot of finished article major surface area, preferably about 0.1 ounce to about 5 pounds of powdered or granular copolymer per square foot of article major surface area. In accordance with one embodiment, a supply of a liquid-impermeable flexible sheet material 136 in roll form 138 may be disposed above the continuous product conveyor belt 134 to provide a continuous supply of liquid-impermeable flexible sheet material (membrane) 136 onto an upper surface of the product conveyor belt 134. The upper surface of sheet material 136 from roll 138 may be sprayed with liquid adhesive from adhesive vessel 139 to adhere the sheet material to an undersurface of the geotextile sheet or mat 115, and the powdered or granular copolymer then is deposited onto the geotextile sheet or mat 115 from one, two or all three of the feed conveyor belts 128, 130 and 132. Any one, two or all three of the feed conveyor belts 128, 130 and 132 can be used to incorporate the same or different powdered or granular materials throughout a portion of, or the entire thickness of the geotextile sheet or mat 115. Vibration apparatus 140 may be connected to the product conveyor belt directly below the feed conveyor belts 128, 130, and 132 to vibrate the powdered or granular contaminant-reactant materials into the geotextile sheet or mat 115.

The powdered or granular copolymer is deposited across the entire width of the geotextile sheet or mat 115, as the particles drop from the feeders 122, 124 and/or 126. In this manner, the entire thickness or any portion of the thickness of the fibrous mat 115 may be filled with the copolymer. Dust collection suction devices 144, 146 and 148 may be disposed near each continuous feed conveyor belt 128, 130 and 132 to clear the air of fine particles emanating from feeding mechanisms 122, 124 and 126 and return the particles back to a dust collector 167 for disposal and/or back to the receiving hopper 102, via conduit 149. A second flexible, water-impermeable sheet material 150, from roll 151, is disposed on a downstream side of the copolymer feeding mechanisms 122, 124, and 126 and above the product conveyor belt 134. The second flexible sheet material 150 is fed by power driven roller 152, power rollers 154 and 156 and wind up rollers 158 and 160 to dispose a flexible, water-impermeable sheet material 150 on top of the contaminant-reactant-containing article to dispose the geotextile sheet or mat 115 and the separate, or geotextile-contained copolymer, between lower flexible sheet material 136 between the geotextile sheet or mat 115 and the upper flexible, water-impermeable primary barrier layer 150. Adhesive vessel 161 preferably applies adhesive to a surface of sheet material 150 to adhere the sheet material 150 to an upper surface of the copolymer-containing geotextile sheet or mat 115.

The copolymer functions to absorb high conductivity multivalent ion-containing salt water regardless of its particle size. The powdered or granular copolymer preferably has a particle size in the range of about 10 $\mu$m to about 500 $\mu$m, preferably about 50 $\mu$m to about 1,000 $\mu$m, more preferably about 50 $\mu$m to about 800 $\mu$m, and most preferably a particle size distribution of about 50 $\mu$m to about 800 $\mu$m containing up to 100% of the particles in the 50 $\mu$m to 200 $\mu$m range, preferably about 10 wt % to about 50 wt % in the 50 $\mu$m to 200 $\mu$m range, with 50 to 90 wt. % of the particles in the 200 $\mu$m to 800 $\mu$m size range.

Figure 8:
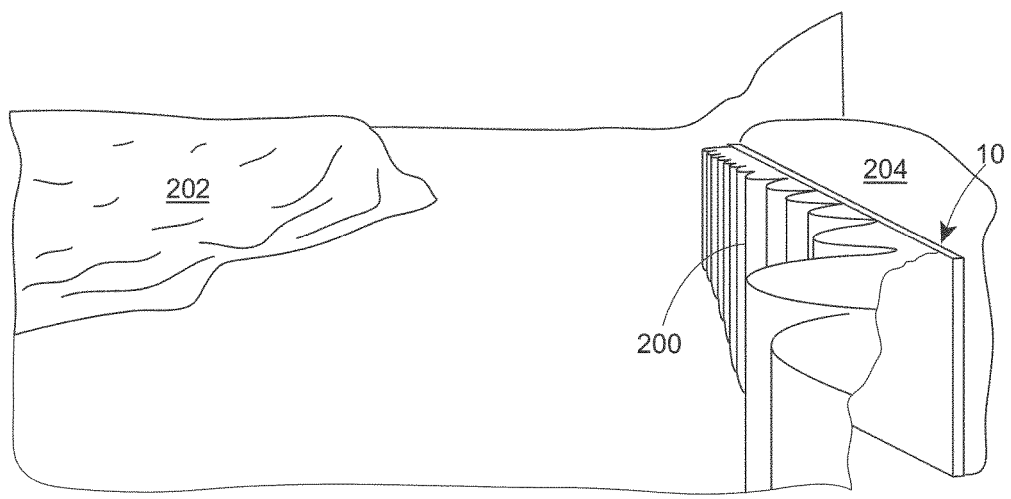
FIG. 8 is perspective view of a geocomposite article described herein oriented vertically, adjacent to a sea/soil interface.

As shown in FIG. 8, the geocomposite articles of FIGS. 3 and 6 containing the partially cross-linked acrylamide/acrylate/acrylic acid copolymers described herein are particularly effective for vertical disposition adjacent to a sea/soil interface 200 for protecting the soil interface from salt water penetration by ocean 202 which would otherwise penetrate the sea/soil interface 200 into soil 204.

The lower geotextile sheet or mat 24 or 115, and the upper geotextile sheet or mat 28 or 136, can be woven or non-woven, preferably non-woven. Suitable fibers of construction of the geotextile mats 24 or 28, and 115 or 136 include fibers made from rayon, polypropylene, polyesters, nylon, acrylic polymers and copolymers, ceramic fiber, fiberglass, propylene-ethylene copolymers, polypropylene-polyamide copolymers, a single monofilament, polyethylene, polyurethane, cotton, jute and any other non-biodegradable, or very slowly biodegradable, fibers preferably having both bacteriological, hydrolytic and chemical resistance. In some installations, the thickness of the article is not important and such articles can be formed with any desired thickness, e.g., 3 mils to about 4 inches containing about 0.1 oz to about 30 pounds per square foot of copolymer SAP.

The product performance is tested by hydrating the product in both DI water and simulated sea water.

To prepare the simulated sea water salt (i.e. instant ocean) was dissolved in deionized water. Typically, a solution is prepared with 4.5% aquarium salt in deionized water to achieve a ~50,000 µS/cm conductivity.

The samples are cut in 4"×8" strips in the machine direction of the web. The samples are placed in plastic containers 13"×8"×4.5" (L×W×D). The samples are hydrated with 2 liters of water for 12 hours. The mass of the 4"×8" sample was measured before and after hydration using an analytical balance. Active material lost at the edges of the product was ignored.

The data for the GCA-1 examples are shown below in Table 1 for examples 1-13. GCA-1 examples 1-13 were prepared using a 45:55 (by weight) mixture of SAP and an EVA-based powdered adhesive respectively. The SAP/adhesive powder blends were prepared using a ribbon blender. The textiles used in these examples was a 4 oz/yd$^2$ FLW geotextile. The SAP/adhesive loading ranged from 21.2 to 42.1 grams/ft$^2$ The swell capacity of the examples in various media was determined by the following equation:

$$PercentSwellCapacity = \frac{WetSample - DrySample}{DrSample} \times 100. \quad \text{Eqn 1}$$

Figure 9:
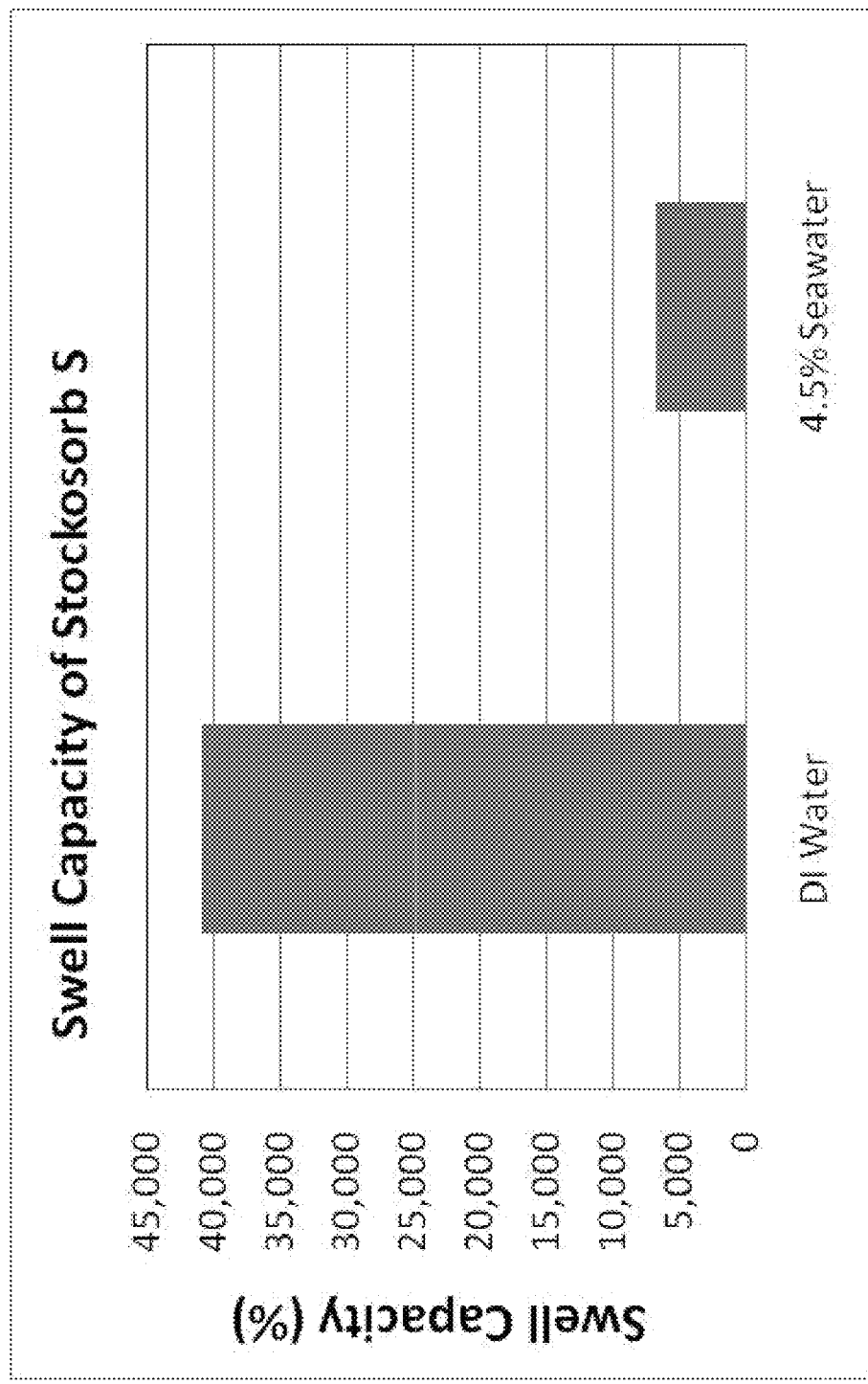
FIG. 9. Is a chart showing the swell capacity of Stockosorb S in deionized water and simulated seawater at 4.5% aquarium salt in water.

For comparative purposes, a swell capacity test was performed on the superabsorbent contained in cheesecloth in both deionized water and simulated seawater. The swell capacity of Stockosorb S was in deionized water and seawater was calculated at 40,900% and 6,700% respectively, as shown in FIG. 9. In terms of absorptivity, the Stockosorb S was found to absorb 410 grams of deionized water for every gram of dry SAP. In simulated seawater, the absorbivity was found to be lower at 68 grams of seawater for every gram of dry SAP.

Figure 10:
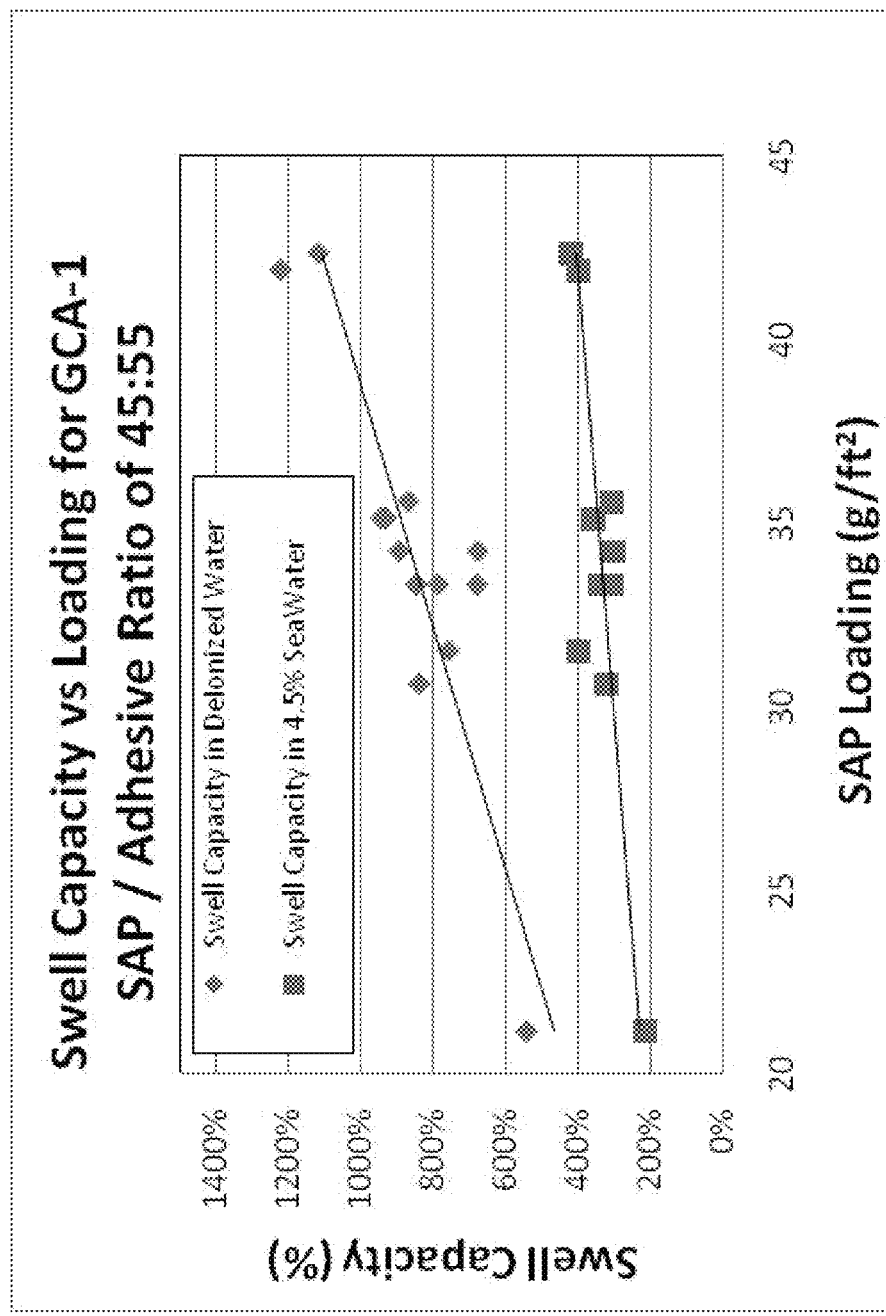
FIG. 10. Is a graph relating the swell capacity of GCA-1 examples 1-13 to the loading level of SAP

Shown in Tables 1 are the results of swell testing for the GCA-1 materials made using the process described in FIG. 2. In deionized water, the GCA-1 examples exhibited a swell capacity ranging from 546% to 1224% which was dependent on the loading of SAP. In simulated seawater, the swell capacity was lower and ranged from 218 to 422%. FIG. 10 shows the relationship between the SAP loading and the swelling capacity of the GCA-1 product.

The swelling capacity relative to the SAP loading in each media was also calculated to determine the influence of confinement in the GCA-1 composite. For deionized water, it was found that the swelling capacity of the SAP was reduced from 40,900% to an average of 2,375% when confined in the GCA-1 composite examples. For simulated seawater, the swelling capacity of the SAP was reduced from 6,700% to an average of 880% when the SAP was confined in the GCA-1 composite examples.

The above-described products can be modified in a number of ways to suit various purposes and this adaptability of the products is one of the primary benefits when compared with water barriers of the prior art. For example, the geocomposite products described herein can be loaded with a heavy material such as metal screen, or a heavy mineral such as Barite, iron oxide or the like, relatively uniformly, together with the powdered or granular copolymer so that the overall product has a specific gravity greater than 1.0 thereby enabling the material to submerge easily in water. Accordingly, the product can be applied to the soil surface at the bottom of a filled lagoon, waste containment area, and the like, without first draining the lagoon or waste containment area. The product containing a heavy mineral can be rolled out over the water or waste containment upper level and allowed to sink to cover the soil surface at the bottom of the water or liquid waste material, thereby saving substantial time, effort and expense in sealing a pre-existing

TABLE 1

Analytical Data for GCA-1 at Various Active Loading Levels

| Product | Example # | Estimated SAP Loading (g/ft2) | Swell Capacity of GCA-1 in DI Water (%) | Swell Capacity Relative to SAP Content Only in DI Water (%) | Swell Capacity of GCA-1 in 4.5% SeaWater (%) | Swell Capacity Relative to SAP Content Only in 4.5% Seawater (%) |
|---|---|---|---|---|---|---|
| GCA-1 | 1 | 34.2 | 680% | 1858% | 310% | 793% |
| GCA-1 | 2 | 33.3 | 789% | 2200% | 338% | 885% |
| GCA-1 | 3 | 35.1 | 934% | 2569% | 357% | 920% |
| GCA-1 | 4 | 33.3 | 849% | 2365% | 343% | 896% |
| GCA-1 | 5 | 31.5 | 760% | 2156% | 401% | 1090% |
| GCA-1 | 6 | 33.3 | 683% | 1883% | 309% | 797% |
| GCA-1 | 7 | 35.1 | 944% | 2608% | 360% | 933% |
| GCA-1 | 8 | 30.6 | 841% | 2421% | 325% | 874% |
| GCA-1 | 9 | 35.55 | 871% | 2389% | 309% | 783% |
| GCA-1 | 10 | 21.15 | 546% | 1766% | 218% | 645% |
| GCA-1 | 11 | 42.3 | 1120% | 2937% | 422% | 1044% |
| GCA-1 | 12 | 41.85 | 1224% | 3229% | 403% | 996% |
| GCA-1 | 13 | 34.2 | 896% | 2491% | 302% | 773% | lagoon, waste containment area, and the like, without first draining the lagoon or waste containment area.

In another embodiment, the products described herein can have incorporated therein a very light material such as expanded vermiculite or expanded perlite, so that the product has substantial buoyancy in water, liquid waste materials, and the like, to form a cover over a liquid waste containment area, such as a toxic waste lagoon, to prevent external compounds, dust, and dirt from entering the waste containment area. One portion of this cover material can be adapted for removal or rolling back so that additional toxic waste and the like may be added to the covered containment area while maintaining a water-impervious cover to prevent further filling of the waste containment area with rain water.

The products described herein can be essentially a single copolymer-containing, non-woven fabric material, adhered to a water-impermeable cover layer, e.g., polyvinyl chloride (PVC) primary barrier sheet. Preferably, the geocomposite article includes an upper barrier layer, such as a polyvinyl chloride (PVC) sheet material adhesively secured to a woven or non-woven sheet material containing the partially cross-linked acrylamide/acrylate/acrylic acid copolymer. Further, drainage structures and other articles used in the water drainage arts can be virtually incorporated into the interior of this product during manufacture, e.g., under the upper cover sheet. Herbicides, bactericidal materials, tracer chemicals, various colorants that indicate contact with a particular chemical or class of chemicals, and the like, also can be incorporated into the articles described herein.

The product is particularly effective in shored wall conditions for application against steel sheet piling; soldier beam and lagging; soldier beam and earth installations; concrete caissons; earthen stabilized wall structures and diaphragm wall structures.

The uses for the powdered or granular copolymer SAP-containing products described herein are virtually infinite since the product can be made completely flexible, relatively rigid or rigid and can be applied against very contoured and slopping surfaces, rough or smooth, as well as vertical surfaces, such as foundation walls, dams, along the sides of canals and below grades such as in tank farms, and for irrigation and water conservation techniques.

In order to demonstrate the "healing" capacity of the partially cross-linked acrylamide/acrylate/acrylic acid copolymers described herein, geocomposite test articles for the GCA-2 composite were prepared from a PVC sheet material geomembrane having a thickness of 0.060 inch adhesively secured (using a PVC based plastisol) to a GCA-1 sample composite which was described previously for examples 1-13. The PVC membrane was coated with the plastisol and heated to 350 of in a oven for a few seconds under pressure to cure the plastisol and adhere the PVC to the GCA-1 sample. Control samples of both GCA-1 (Example 16) and GCA-2 (Example 17) were prepared in similar manners as described to produce examples 1-15 however, the SAP was not added to the control composites.

The GCA-1 and GCA-2 composite samples were cut into circular shapes with a diameter of 10 cm, having a surface area of 78.54 $cm^2$. The geocomposite test articles were cut with a 1 inch slit through all layers and sealed into a 1 liter test cell. Over the cut was placed a small porous stone and weight to approximate 20 lbs per square foot confining pressure over the surface area of the sample. The cell was filled with simulated seawater (~4.5 wt % aquarium salt in deionized water) so that the water had a conductivity of ~50,000 µS/cm. The cell was connected to a tower which was elevated to apply 4 meter hydrostatic head to the sample in the cell. The water supply in the tower was replenished by pumping the simulated seawater from a reservoir to maintain a consistent head pressure at all times. The samples were allowed to hydrate for 1 hour prior to initiating the test. The test was initiated by opening a port at the bottom of the cell with an opening diameter of 3.80 mm. The water leaving the cell was collected in a bucket and weighed after known time intervals to determine the leakage rate.

The performance of the articles described herein is measured by a "self-healing performance index" or "SPI" which is calculated according to the following formula: SPI=ST/SC, wherein ST=Flow rate of fluid through a one inch slit completely through the thickness of a sample (mL/min) after steady state flow has been achieved, wherein SC=the Flow rate through a control sample (mL/min) after steady state flow has been achieved.

To achieve the full advantage of the articles and methods described herein, the articles tested as described above should have an SPI less than 0.1, preferably less than 0.01, more preferably less than 0.015, even more preferably less than 0.005 and most preferably less than 0.001.

Shown in Table 2 are the SPI results for the GCA-1 and GCA-2 composite examples. The SPI value for GCA-1 was calculated to be 0.0009, whereas the SPI value for the GCA-2 was calculated to be 0 since the sample did not exhibit any leaking in the time frame of the test.

TABLE 1

SPI Data for GCA-1 and GCA-2 Composites

SPI Testing for GCA-1 and GCA-2

| SPI Testing | GCA-1 Control (No SAP) Example 15 | | GCA-1 Example 14 | | GCA-2 Control (No SAP) Example 16 | | GCA-2 Example 15 | |
|---|---|---|---|---|---|---|---|---|
| | Elapsed Time (min) | Amount Leaked (ml) | Elapsed Time (min) | Amount Leaked (ml) | Elapsed Time (min) | Amount Leaked (ml) | Elapsed Time (min) | Amount Leaked (ml) |
| Time 1 | 10 | 13100 | 60 | 253 | 10 | 165 | 60 | 0 |
| Time 2 | 20 | 27807 | 120 | 428 | 20 | 323 | 120 | 0 |
| Time 3 | 30 | 38904 | 180 | 542 | 30 | 477 | 180 | 0 |
| Time 4 | 40 | 51664 | 450 | 842 | 40 | 645 | 450 | 0 |
| Time 5 | 50 | 64372 | | | 50 | 801 | | |
| Time 6 | 60 | 77897 | | | 60 | 958 | | |
| Steady State Leak Rate (ml/min) | 1275 | | 1.2 | | 15.906 | | 0 | |
| SPI Results: | GCA-1 SPI Result = 0.0009 | | | | GCA-2 SPI Result = 0 | | | |

The invention claimed is:

1. A self-healing geocomposite article comprising:
   a) a pair of adjacent and coextensive woven or non-woven geotextile fabrics needle-punched together containing a powdered or granular self-healing copolymer particle layer contained therein, at an interface thereof, or sandwiching the self-healing layer therebetween;
   b) the self-healing layer comprising a partially cross-linked, water-insoluble powdered or granular high conductivity—water absorbent copolymer particles, having 50 wt. % to 90 wt. % of the particles in the 200 µm to 800 µm size range, and about 10 wt. % to about 50 wt.% having a size of 50 µm to 200 µm, and capable of absorbing water having a conductivity of at least 1 mS/cm, said copolymer containing about 25-80 mole % acrylamide; about 15-40 mole % sodium or potassium or lithium or ammonium acrylate; and about 5-20 mole % acrylic acid;
   wherein the geocomposite article exhibits a self-healing performance index less than 0.1 when tested by placing a 1 inch slit through all layers of the geocomposite article sealed at its edges under 4 meters of water with a conductivity of 1 mS/cm or greater, and
   wherein said geocomposite article, further includes a water-impermeable membrane layer adhered to and essentially coextensive with an outer major surface of one of the geotextile fabrics.

2. The self-healing geocomposite article of claim 1, wherein the membrane layer comprises a polymeric sheet material.

3. The self-healing geocomposite article of claim 1, wherein the powdered or granular self-healing copolymer is included in the article in an amount in the range of 0.1 ounce to 5 pounds per ft$^2$ of a major surface area of the article.

4. The self-healing geocomposite article of claim 1 wherein the self-healing copolymer layer has a free swell of greater than 35 mL/ 2 grams material in 4.5% sea salt in water solution.

5. The self-healing geocomposite article of claim 1, wherein the active-self-healing layer comprises a combination of a powdered or granular self-healing copolymer together with a second powdered or granular material selected from the group consisting of sodium smectite clay; organophilic clay; activated carbon; coke breeze; zero-valent iron; apatite; zeolite; pete moss; polymeric ion-exchange resin; polymeric adsorbent; and a mixture thereof.

6. The self-healing geocomposite article of claim 5, wherein the second powdered or granular material is included with the copolymer in an amount less than 50 wt. % based on the total weight of the copolymer and the second powdered or granular material.

7. The self-healing geocomposite article of claim 1, wherein the self-healing copolymer layer comprises a partially cross-linked, water-insoluble acrylamide/acrylic acid/ potassium acrylate copolymer identified by the CAS #31212-13-2.

8. The geocomposite article of claim 1, wherein the powdered or granular copolymer includes less than 5000 ppm acrylamide monomer.

9. The geocomposite article of claim 8, wherein the powdered or granular copolymer includes less than 1,000 ppm acrylamide monomer.

10. The geocomposite article of claim 9, wherein the powdered or granular copolymer includes less than 100 ppm acrylamide monomer.

11. The geocomposite article of claim 1, wherein at least one of the geotextile fabrics, prior to receiving the powdered or granular self-healing copolymer layer, has an apparent opening size in the range of about 0.5 mm to about 6 mm.

12. The geocomposite article of claim 1, wherein the powdered or granular self-healing copolymer layer comprises about 50% to about 99.9% by volume of at least one of the geotextile fabrics.

13. The geocomposite article of claim 1, wherein at least one of the geotextile fabrics is non-woven.

14. The self-healing geocomposite article of claim 1,
   wherein the woven or non-woven geotextile fabrics sandwich a distinct intermediate self-healing layer of said copolymer therebetween.

15. A geocomposite article capable of providing a water barrier to water having a conductivity of at least 1 mS/cm comprising:
   a pair of adjacent geotextile fabrics formed from woven or non-woven fibers;
   a powdered or granular partially cross-linked, water-insoluble acrylamide/acrylate/acrylic acid copolymer that contains about 25-80 mole % acrylamide; about 15-40 mole % sodium or potassium or lithium or ammonium acrylate; and about 5-20 mole % acrylic acid, having 50 wt. % to 90 wt. % of the particles in the 200 µm to 800 µm size range, and about 10 wt. % to about 50 wt. % of the particles in the 50 µm to 200 µm size range, and carried in or on at least one of said geotextile fabrics at an interface of said two geotextile fabrics, said two geotextile fabrics needle-punched together surrounding the copolymer;
   a water-impermeable cover sheet adhered to a major surface of one of the geotextile fabrics;
   wherein the geocomposite article exhibits a self-healing performance index less than 0.1 when tested by placing a 1 inch slit through all layers of the geocomposite article sealed at its edges under 4 meters of water with a conductivity of 1 mS/cm or greater, and
   wherein said geocomposite article, further includes a water-impermeable membrane layer adhered to and essentially coextensive with an outer major surface of one the geotextile fabrics.

16. The geocomposite article of claim 15, wherein the water contains multivalent ions selected from the group consisting of Na+, Mg++, Ca++, Al+++ and combinations thereof.

17. The geocomposite article of claim 15, wherein the geocomposite article further includes a powdered or granular reactive material selected from the group consisting of activated carbon, coke breeze, zero-valent iron, apatite, organophilic clay, zeolite, polymeric ion exchange resins, polymeric adsorbing resins and mixtures thereof.

18. The geocomposite article of claim 17, wherein the powdered or granular reactive material comprises about 50% to about 99.9% by volume of the geotextile fabrics.

19. The geocomposite article of claim 15, wherein the geotextile fabrics contain fibers selected from the group consisting of polyolefin, polyester, polyamide, and copolymers of any two or more of the foregoing.

20. The geocomposite article of claim 15, wherein at least one of the geotextile fabrics, prior to receiving the powdered or granular copolymer, has an apparent opening size in the range of about 0.5 mm to about 6 mm.

21. The geocomposite article of claim 15, wherein both of the geotextile fabrics are non-woven.

22. A method of manufacturing a geocomposite article that provides a barrier to water having a conductivity of at least 1 mS/cm comprising:
   providing a woven or non-woven lower geotextile fabric;
   contacting the lower geotextile fabric with a powdered or granular partially cross-linked, water-insoluble acrylamide/acrylate/acrylic acid copolymer that contains about 25-80 mole % acrylamide; about 15-40 mole % sodium or potassium or lithium or ammonium acrylate; and about 5-20 mole % acrylic acid, said copolymer having 50 wt. % to 90 wt. % of the particles in the 200 μm to 800 μm size range, and about 10 wt. % to about 50 wt. % of the particles in the 50 μm to 200 μm size range, and causing at least a portion of the powdered or granular copolymer to flow into the geotextile fabric to fill at least a portion of the geotextile fabric within openings thereof; and disposing an upper geotextile fabric over the copolymer and needle-punching the geotextile fabrics together to seal the copolymer between the upper and lower geotextile fabrics;

wherein the geocomposite article exhibits a self-healing performance index less than 0.1 when tested by placing a 1 inch slit through all layers of the geocomposite article sealed at its edges under 4 meters of water with a conductivity of 1 mS/cm or greater; and wherein said geocomposite article, further includes a water-impermeable membrane layer adhered to and essentially coextensive with an outer major surface of one the geotextile fabrics.

23. The method of claim 22, further including the step of covering edges of the pre-formed geotextile mat with a water-impermeable sheet material layer.

24. The method of claim 23, wherein the edges of the geotextile sheet or mat are covered with excess material from the water-impermeable cover sheet.

25. The method of claim 24 wherein the excess material of the cover sheet is secured to cover the edges of the geotextile fabric by adhesively securing the cover sheet over the edges of the geotextile fabric, or heat-sealing the cover sheet surrounding the edges of the geotextile fabric.

26. The method of claim 22, wherein the powdered or granular copolymer is caused to flow into the lower geotextile fabric by vibrating the geotextile fabric while in contact with the powdered or granular copolymer.

27. The method of claim 22, wherein the powdered or granular copolymer is caused to flow into the lower geotextile fabric by applying a vacuum to an undersurface of the geotextile fabric to draw the powdered or granular copolymer into the sheet or mat from an upper surface.

28. The method of claim 22 further including the step of providing the water-impermeable cover sheet having a dimension larger than the major surface of the geotextile fabric to provide excess cover material so that the excess cover material extends over an edge surface of the geocomposite article, and securing the excess cover material to the geotextile article to cover the edge surface, thereby reducing or eliminating escape of powdered or granular copolymer through the covered edge surface of the geotextile article.

29. The method of claim 28, including the step of covering all edge surfaces with excess cover sheet material, and securing the excess cover material to the geocomposite article thereby reducing or eliminating escape of powdered or granular copolymer through all edge surfaces of the geotextile article.

30. The method of claim 28, wherein the cover sheet is secured over the edge surface by an expedient selected from the group consisting of adhesively securing, thermal welding techniques, vibrational welding and ultrasonic welding.

31. A method of water proofing a surface from contact with a water source having a conductivity of at least 1 mS/cm comprising disposing a geocomposite article in contact with the surface, such that the geotextile article is in contact with said surface, said geocomposite article comprising:

a) a pair of adjacent and coextensive woven or non-woven geotextile fabrics needle-punched together having a self-healing copolymer contained therein, at an interface thereof, or sandwiching the self-healing copolymer therebetween; and b) a water-impermeable membrane layer adhered to and essentially coextensive with an outer major surface of one of the geotextile fabrics;

c) the self-healing layer comprising a partially cross-linked, water-insoluble powdered or granular high conductivity—water absorbent material that absorbs water having a conductivity of at least 1 mS/cm comprising a copolymer of acrylamide, acrylic acid, and acrylic acid salt; and wherein the geocomposite article exhibits a self-healing performance index less than 0.1 when tested by placing a 1 inch slit through all layers of the geocomposite article sealed at its edges under 4 meters of water with a conductivity of 1 mS/cm or greater.

32. A method of water proofing a surface from contact with a water source having a conductivity of at least 1 mS/cm comprising disposing a geocomposite article on said surface, such that a water-impermeable membrane layer first contacts the water source, said geocomposite article comprising:

a) a pair of adjacent and coextensive woven or non-woven geotextile fabrics needle-punched together having a self-healing copolymer contained therein, at an interface thereof, or sandwiching the self-healing copolymer therebetween; and b) a water-impermeable membrane layer adhered to and essentially coextensive with an outer major surface of one of the geotextile fabrics;

c) the self-healing layer comprising a partially cross-linked, water-insoluble powdered or granular high conductivity—water absorbent material that absorbs water having a conductivity of at least 1 mS/cm comprising a copolymer of acrylamide, acrylic acid, and acrylic acid salt; and wherein the geocomposite article exhibits a self-healing performance index less than 0.1 when tested by placing a 1 inch slit through all layers of the geocomposite article sealed at its edges under 4 meters of water with a conductivity of 1 mS/cm or greater.

33. A method of manufacturing a geocomposite article that provides a barrier to water having a conductivity of at least 1 mS/cm comprising:

providing a woven or non-woven lower geotextile fabric;

contacting the geotextile fabric with a blend of a meltable adhesive and powdered or granular partially cross-linked, water-insoluble acrylamide/acrylate/acrylic acid copolymer, and causing at least a portion of the powdered or granular copolymer to flow into the geotextile fabric to fill at least a portion of the geotextile fabric within openings thereof; and disposing an upper geotextile fabric over the blend of meltable adhesive and copolymer and applying heat and pressure to melt and flux the adhesive around copolymer particles and fuse the geotextile fabrics together and to seal the copolymer between the upper and lower geotextile fabrics; and securing a liquid-impermeable cover sheet to a major surface of one of the geotextile fabrics;

wherein the geocomposite article exhibits a self-healing performance index less than 0.1 when tested by placing a 1 inch slit through all layers of the geocomposite article sealed at its edges under 4 meters of water with a conductivity of 1 mS/cm or greater.

34. The method of claim 33, wherein the meltable adhesive is a powder and the adhesive and copolymer are blended in a weight ratio of 55/45.

35. The method of claim 33, wherein the lower and upper geotextile fabrics are needle-punched together.

36. The method of claim 33, including adding a second powdered or granular material to said geotextile fabric, said second powdered or granular material selected from the group consisting of sodium smectite clay; organophilic clay; activated carbon; coke breeze; zero-valent iron; apatite; zeolite; pete moss; polymeric ion-exchange resin; polymeric adsorbent; and a mixture thereof.

* * * * *